June 9, 1964  A. M. CLINCH  3,136,417
TREATMENT OF RUBBER GOODS
Filed March 15, 1962

Allan M. Clinch
INVENTOR

BY
Blum, Moscovitz, Friedman &
Blum

ATTORNEYS.

United States Patent Office 3,136,417
Patented June 9, 1964

3,136,417
TREATMENT OF RUBBER GOODS
Allan M. Clinch, Akron, Ohio, assignor to The Akwell Corporation, Akron, Ohio, a corporation of Delaware
Filed Mar. 15, 1962, Ser. No. 179,921
15 Claims. (Cl. 206—63.2)

This invention relates to the treatment of rubber goods. More particularly, it relates to the application of a film of oil to the surface of rubber sheaths suitable for prophylaxis purposes such as finger cots, prophylactics, and the like.

It is known to apply to the surface of rubber sheaths, in order to provide lubrication, gelatin and glycerine. It has also been proposed to employ for this purpose algenates, carboxymethylcellulose, and silicone oil emulsions. As well as being treated with such materials, the surfaces are also commonly treated with a dusting compound such as talc, mica and the like. The dusting compound functions to reduce tack, and while the lubricant has a similar effect, the dusting compound is relied upon principally for this purpose.

It is an object of the instant invention to provide a surface treatment for the rubber sheathing which provides for lubrication and, in addition, permits the production of goods of high transparency, especially sheathing which bears on its surface dusting compounds.

Another object of the invention is to provide a surface treatment for rubber sheathing which provides for lubrication and provides high transparency as aforesaid, and, in addition, does not involve applying or associating with the surface of the rubber goods an amount of liquid or semi-liquid such that liquid or semi-liquid becomes readily detached from the sheathing upon handling. This, it is an object of the invention to provide a surface treatment which does not render the goods in a condition such that it is unpleasant to handle them.

Still another object of the invention is to provide a surface treatment suitable to provide for lubrication and provide good transparency, and, in addition, provide the goods in a condition such that they can be packaged in an advantageous manner. According to the invention, material applied to the surface of the goods covers the surface as a film which substantially adheres to the surface and does not readily become detached therefrom. Hence, rubber sheaths treated according to the invention, can be packaged in hermetically sealed containers and material used to treat the surface does not become detached from the surface, so as to make for a messy package, which upon opening for removal of the sheathing would be objectionable in that some of the surface treatment material would be free and likely drip from the package or be picked up by the skin of the user.

Still another object is to provide a method for applying a material to rubber sheathing which requires the use of very little material, and is convenient and economical.

The invention is further described with reference to the accompanying drawing, of which:

Figure 3:
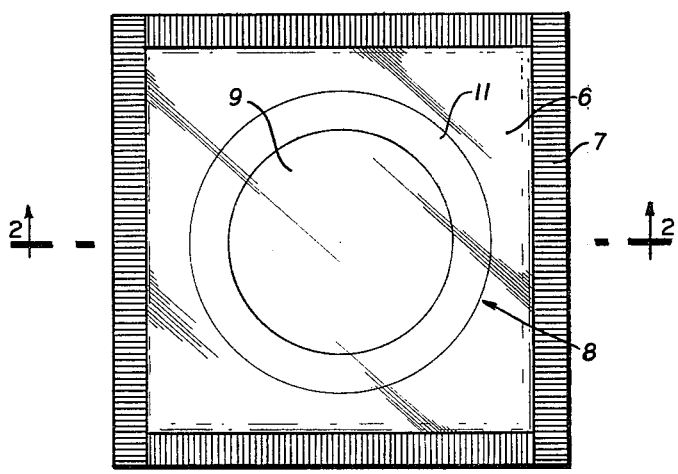
FIG. 3 is a plan view of a hermetically sealed package containing a rubber sheath treated according to the invention.
Figure 2:
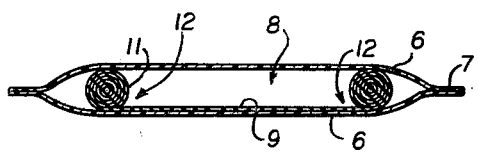
FIG. 2 is a sectional view taken along line 2—2 in FIG. 3.

The package shown in the drawing comprises a transparent covering 6 having sealed edges 7 which hermetically seal the contents of the package. If desired, instead of a transparent material for the package, metal foil or other suitable material can be used.

The package contains rubber goods 8. The rubber goods 8 comprise a rubber sheath formed to provide a sleeve having an open end and a closed end upon unrolling from the rolled form which is shown in the drawings. The rubber sheath as shown in the drawing is made in a manner well known in the art. In the rolled form, the sheathing is rolled up upon itself from the open end to the closed end to provide the sheathing with a closed end portion 9 bridging the area within the roll 11 into which the balance of the sheathing is rolled.

According to the invention, an oil is applied to the surface of the rubber sheathing by first providing the sheathing rolled up upon itself, for example as is shown in the drawing, and then depositing the oil on the rubber, preferably in the center area of the end portion 9.

Figure 1:
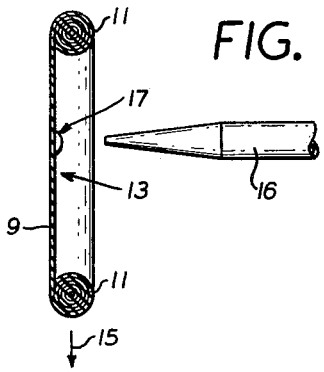
FIG. 1 is a schematic elevation view depicting one procedure for the application of material to rubber goods.

Application by a preferred procedure is shown in FIG. 1. In the manufacture of the rubber goods, after the goods have been rolled up, they are moved along a vertical course indicated by the arrow 15 and leading to a packaging station (not shown) where packaging film material is applied over the goods to form, for example, a covering as is depicted in FIG. 3. While traveling along this vertical course the oil is discharged from a nozzle 16 as a spray, for example, onto the central area 13 of the closed end portion 9. The nozzle can be spaced ¼ to ½ inch from the goods. The oil will then creep radially outwardly to the roll 11 and then through the roll to provide a film of oil on the surface of the rubber which, when unrolled for application, will be the outer surface of the sheath. The operation of the nozzle 16 can be intermittent and merely serve to deposit a small amount of the oil as a drop or several drops 17 on the closed end portion 9.

Other procedures can be utilized for depositing the oil on the goods. Thus, any procedure can be used which will provide the oil at at 12, namely, adjacent the outer terminus of the roll 11, and on the side of the sheathing adjacent the roll. The sheathing is then allowed to stand and the oil creeps along the surface of the goods though the roll. Following deposit of oil, as at 12, the oil will creep over the surface to provide a film over the surfaces of the end portion 9 as well as through the roll. While, the oil is preferably deposited on the side of the end portion 9 which will be part of the outside surface of the sheath (as is represented in FIG. 1), it can be applied to either surface of the closed end portion 9, as it will creep over the surface of the sheathing to cover both sides of the end portion 9 and, in addition, will creep through the roll 11.

Packaging of the goods need not await the creeping of the oil to form a film on the surface of the goods. The creeping can occur following the packaging. Moreover, instead of applying the oil before the packaging as is described in reference to FIG. 1, the oil can be applied during or even after packaging. It is only necessary to deposit a small amount of oil on the rubber as it will thereafter creep to form a film as is desired.

The sheath can, and preferably does, have applied thereto before the application of oil, a dusting compound such as talc, mica, lycopodium, starch, corn meal, corn grits and mixtures thereof. The application of dusting compound to rubber sheathing is well known, and these various dusting compounds have been used heretofore. Dusting compounds preferred for the purposes of the invention are talc or lycopodium or mica or a mixture, for example a mixture of talc and lycopodium. The dusting compound can be applied in the manner practiced herebefore, and before the sheathing is rolled up.

An oil particularly well suited for the purposes of the invention is silicone fluid as is known for service as a release agent and lubricating fluid. The silicone fluid can have a viscosity in the range of about 20–1000 cts. A preferred range for viscosity is about 20–500 cts. Dimethyl silicone oils are well suited to the purpose of the invention. A brand of silicone oil used satisfactorily is the SF-96 silicone oils marketed by General Electric Company and having viscosities in the aforementioned broad range, and preferably in the aforementioned preferred range.

A particularly noteworthy advantage of the invention is that whereas on the one hand good lubrication and transparency are provided, on the other hand, very little of the silicone oil is required. Thus, the amount of silicone oil or fluid can be a fraction of a ml. per inch of diameter of the closed end portion of a rolled up sheath as is depicted in the drawing. For example, on this basis, the amount of silicone oil or fluid can be about 0.1–1.0 ml. and is preferably about 0.1–0.5 ml., for example 0.2 ml. While there would be a lower limit to the amount of silicone fluid for a given service for the fluid, this lower limit cannot be expressed quantitatively since the extent of creeping will depend on the amount of oil used, and, accordingly, the minimum amount suitable for a given service will depend upon the extent of creeping that is desired. In general, it is not necessary to lubricate the entire length of the sheath, and if the end portion adjacent the sheath open end is not lubricated, this condition is without any adverse consequences. As to the upper limit, of course, excess oil can be used, but in general, is not necessary and would merely be wasteful.

As to the extent of creep of the oil on the abovementioned basis of an inch of diameter of the closed end portion, if the roll 11 is sufficient to provide a sleeve of 6–10 inches in length, the aforementioned amounts of silicone oil or fluid (fractions of a ml.) applied as described above, will creep to an extent such that substantially the entire surface (both sides) of the sheathing will be covered by a film of the silicone oil.

To demonstrate the tendency of the oil to creep along rubber sheathing bearing a dusting compound, tests were performed and the data contained in Table I was obtained.

Table I

| Silicone Oil Viscosity | Type Goods | Days | Inches of Climb |
|---|---|---|---|
| (SF-96) | Talc | 3 | 3½ |
|  |  | 9 | 4¾ |
| (SF-96) | Mica | 3 | 3½ |
|  |  | 9 | 4 |
| (SF-96) | Lycopodium | 3 | 4 |
|  |  | 9 | 6⅛ |
| (SF-96) | do | 3 | 6 |
|  |  | 9 | 6⅛ |
| (SF-96) | do | 3 | 4 |
|  |  | 9 | 6½ |

The silicone oil used in these tests is the SF-96 brand oil available commercially.

The use of a silicone fluid or oil according to the invention, is to be distinguished from the use of semi-fluids or greases of silicone and other materials. It is also to be distinguished from the use of emulsions, including water. In the surface treatment of the invention, water is not present and this is a distinct advantage, since the presence of water tends to impart opacity to the sheath.

Preservatives and other additives, as are known in the art for incorporation in materials used to lubricate rubber sheath can be used in utilization of an oil according to the invention.

The invention, as well as providing an improved procedure for treating rubber sheaths, provides an improved and novel rubber sheath article, and also an improved and novel package containing such an article.

As to specific applications for the invention, it has application in respect to surgical and hygienic goods, including doctors' fingers cots, prophylactics, and the like.

In the foregoing specification and claims, viscosity is in centistokes (cts.) at 25° C.

While various specific embodiments of the invention are described above, it is intended to include within the scope of these Letters Patent all such variations, modifications and equivalents as are within the scope of the appended claims.

What is claimed is:

1. The method of applying an oil to the surface of rubber sheathing which comprises:
   providing the rubber sheathing rolled upon itself,
   depositing the oil on the rubber adjacent the outer terminus of the roll and on the side of the sheathing adjacent the roll, and
   allowing the oil to creep along the surface through the roll.

2. The process of applying an oil to the surface of rubber sheathing formed to provide a sheath having an open end and a closed end upon unrolling from a rolled form wherein the sheathing is rolled up upon itself from the open end to the closed end to provide the sheathing with a closed end portion bridging a roll of the balance of the sheathing disposed about the closed end portion, which comprise:
   depositing the oil on the rubber adjacent the outer terminus of the roll and on the side of the sheathing adjacent the roll, and
   allowing the oil to creep along the surface of the sheathing through the roll.

3. The method of claim 2, wherein the surface of the sheathing in the rolled form before application of the oil bears dusting compound.

4. The method of claim 2, wherein the oil is a silicone fluid of viscosity of about 20–1000 cts.

5. The method of claim 4, wherein the amount of silicone fluid is a fraction of a ml. per inch of diameter of the flat closed end portion.

6. The method of claim 2, wherein the oil is sprayed onto the center area of the closed end portion on the side thereof which is to form the outside of the sheath.

7. The method of claim 3, wherein the dusting compound is selected from the group consisting of talc, mica, lycopodium, starch, corn grits, and mixtures thereof.

8. A rolled up rubber sheath of high transparency formed to provide upon unrolling a sheath having an open end and a closed end, the sheathing being rolled up upon itself from the open end to the closed end to provide the sheathing with a closed end portion bridging the balance of the sheathing in an edge roll disposed about the closed end portion, surface of the sheathing in the edge roll bearing a thin film of silicone fluid of viscosity about 20–1000 cts., the said sheath containing 0.1 to 0.5 millilitre of silicone oil.

9. A hermetically sealed package of a rolled up rubber sheath according to claim 8 free of fluids and semi-fluids other than silicone oil borne by the sheathing.

10. A rolled up rubber sheath of high transparency formed to provide upon unrolling a sheath having an open end and a closed end, the sheathing being rolled up upon itself from the open end to the closed end to provide the sheathing with a closed end portion bridging the balance of the sheathing in an edge roll disposed about the closed end portion, surface of said sheathing bearing dusting compound and, over the dusting compound, a thin film of silicone fluid of viscosity about 20–1000 cts., said sheath containing 0.1 to 0.5 millilitre of silicone oil.

11. Rolled up rubber sheathing according to claim 10, the dusting compound being selected from the group consisting of talc, mica, lycopodium, starch, corn meal, corn grits, and mixtures thereof.

12. A hermetically sealed package of a rolled up rubber sheath according to claim 10 free of fluids and semi-fluids other than silicone oil borne by the sheathing.

13. The method of applying a silicone oil to the surface of a rubber sheathing which comprises: providing the rubber sheathing rolled upon itself, depositing 0.1 to 1 millilitre of silicone oil on the rubber adjacent the outer terminus of the roll and on the side of the sheathing adjacent the roll, and allowing the minor quantity of oil to creep along the surface through the roll.

14. The process of applying a silicone oil to the surface of a rubber sheathing formed to provide a sheath having an open end and a closed end upon unrolling from a roll form wherein the sheathing is rolled up upon itself from the open end to the closed end to provide the sheathing with a closed end portion bridging a roll of the balance of the sheathing disposed about the closed end portion, which comprises: spraying 0.1 to 1 millilitre of silicone oil on the rubber adjacent the outer terminus of the roll and on the side of the sheathing adjacent the roll, and allowing the minor quantity of silicone oil to creep along the surface of the sheathing through the roll.

15. The process of claim 14 wherein 0.1 to 0.5 millilitre of silicone oil are sprayed on said sheathing.

References Cited in the file of this patent

UNITED STATES PATENTS

| | | |
|---|---|---|
| 2,006,212 | Grabler | June 25, 1935 |
| 2,096,296 | Fromm | Oct. 19, 1937 |
| 2,339,283 | Mendel | Jan. 18, 1944 |
| 2,649,090 | Parsons et al. | Aug. 18, 1953 |